(12) United States Patent
Mercado

(10) Patent No.: US 6,311,640 B1
(45) Date of Patent: Nov. 6, 2001

(54) ANIMAL FOOD/WATER DISH

(76) Inventor: Sarah J. Mercado, 200 Valley View Rd., #1F, Fountain Inn, SC (US) 29644

( * ) Notice: Subject to any disclaimer, the term of this patent is extended or adjusted under 35 U.S.C. 154(b) by 0 days.

(21) Appl. No.: 09/597,329

(22) Filed: Jun. 19, 2000

(51) Int. Cl.⁷ ................................................. A01K 39/00
(52) U.S. Cl. ........................................................ 119/51.01
(58) Field of Search ................................ 119/61, 51.01, 119/51.5

(56) References Cited

U.S. PATENT DOCUMENTS

| | | | |
|---|---|---|---|
| 2,720,862 | * | 10/1955 | Davis ...................................... 119/61 |
| 3,330,257 | * | 7/1967 | Warner, Sr. ............................. 119/61 |
| 3,491,724 | * | 1/1970 | Sunner .................................... 119/61 |
| 4,546,730 | * | 10/1985 | Holland ................................. 119/51.5 |
| 5,125,363 | * | 6/1992 | McGaha ................................ 119/51.5 |
| 5,269,258 | * | 12/1993 | Brown ................................... 119/57.9 |
| 5,467,738 | * | 11/1995 | Cass ........................................ 119/61 |
| 5,560,316 | * | 10/1996 | Lillelund et al. ....................... 119/61 |
| 5,628,276 | * | 5/1997 | Raposa ................................... 119/61 |

* cited by examiner

Primary Examiner—Thomas Price
(74) Attorney, Agent, or Firm—Charles L. Schwab; Hardaway/Mann IP Group

(57) ABSTRACT

A feeding dish particularly suited for feeding small animals such as household pets which has a handle permitting the person feeding the animal to avoid bending and to avoid contact with the animal being feed.

7 Claims, 7 Drawing Sheets

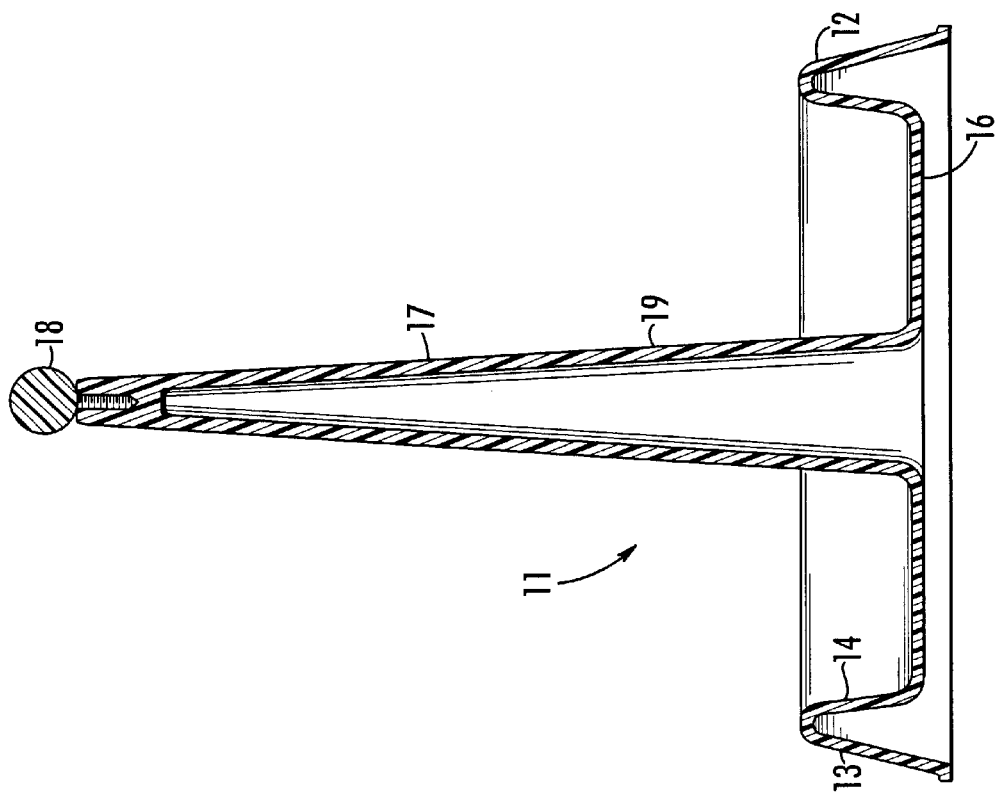
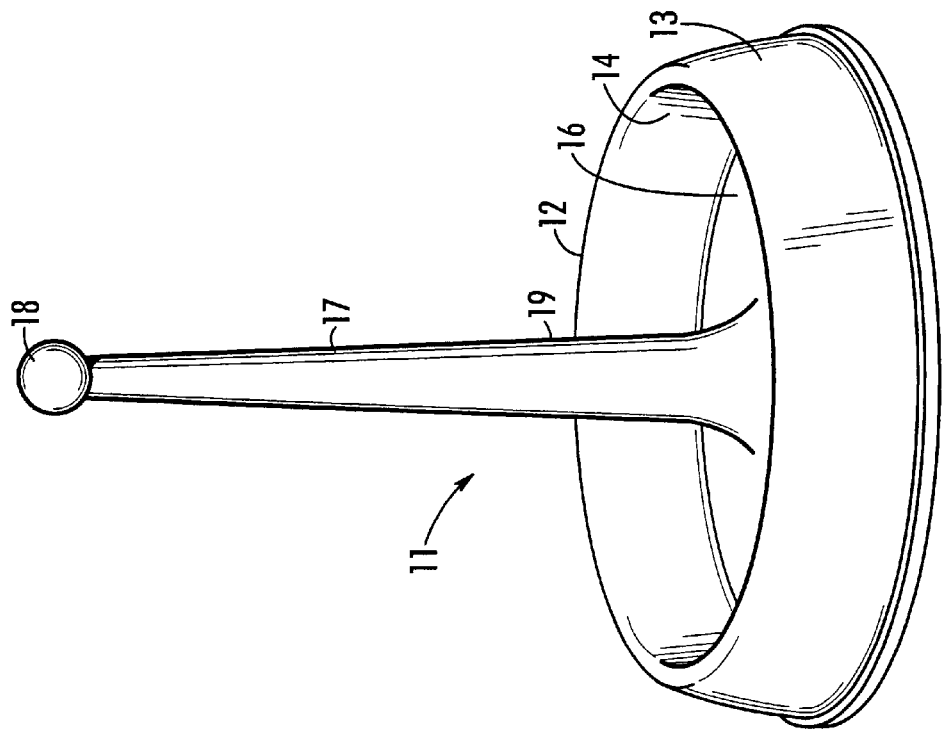

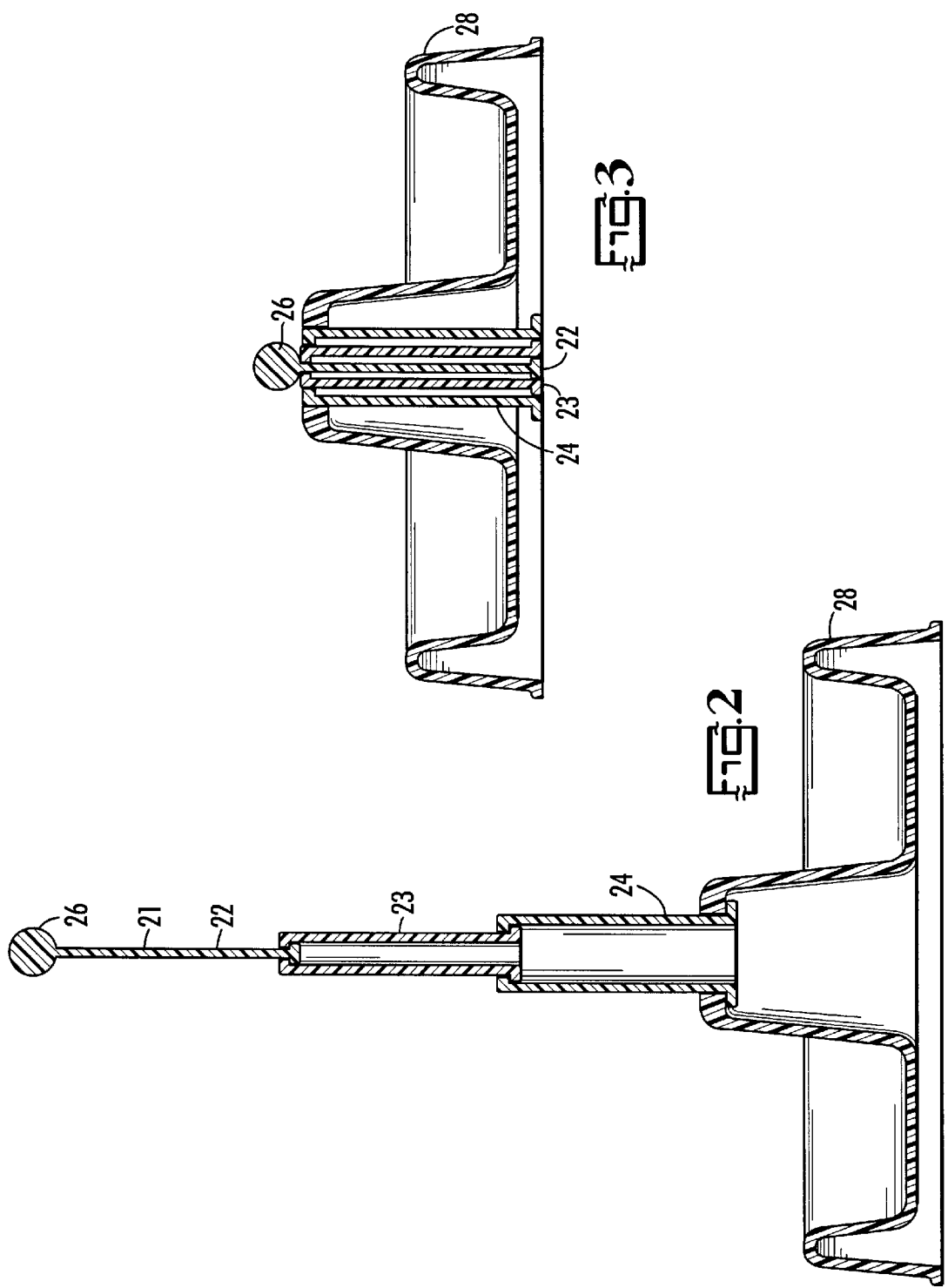

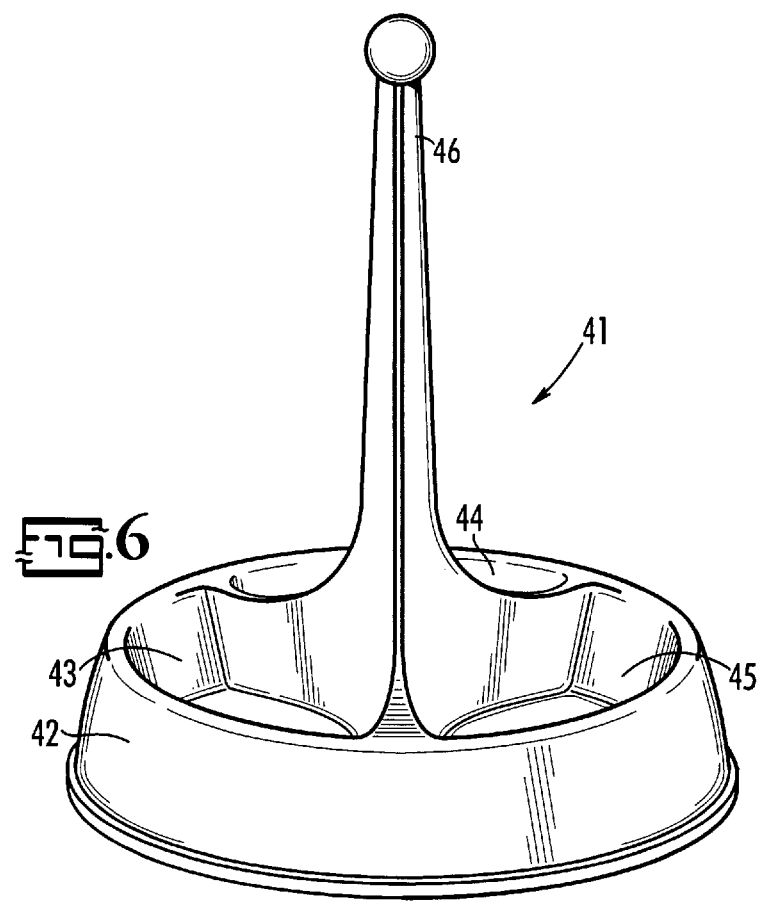
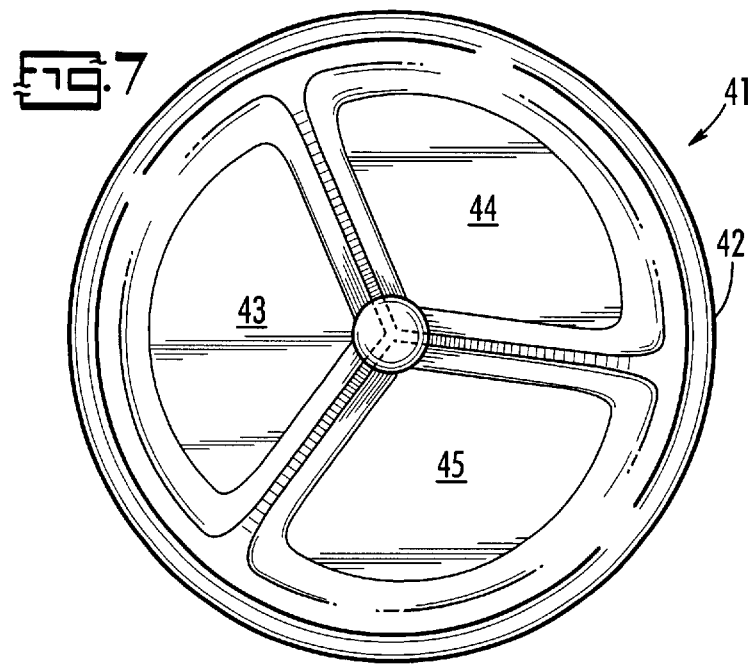

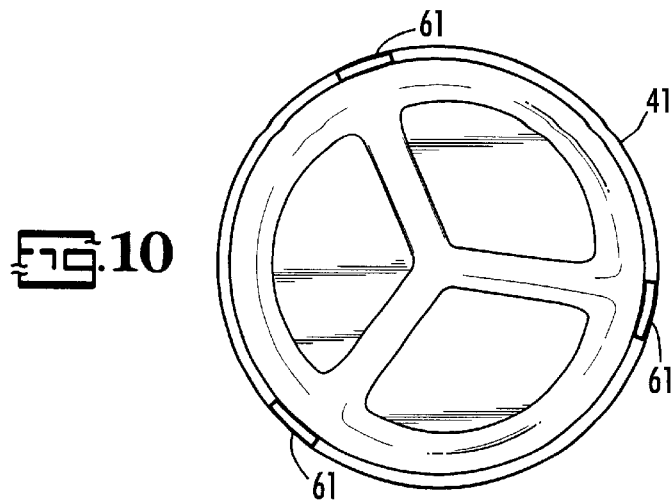
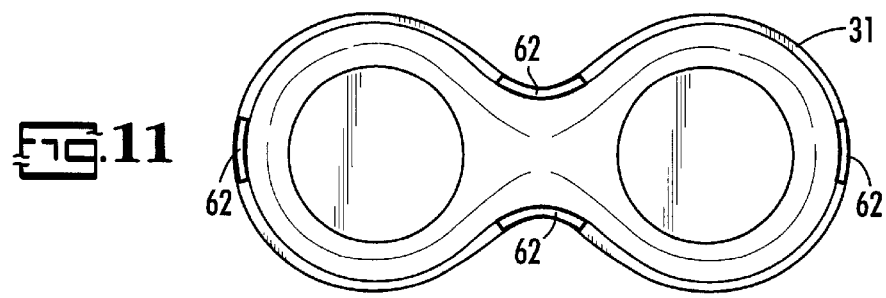
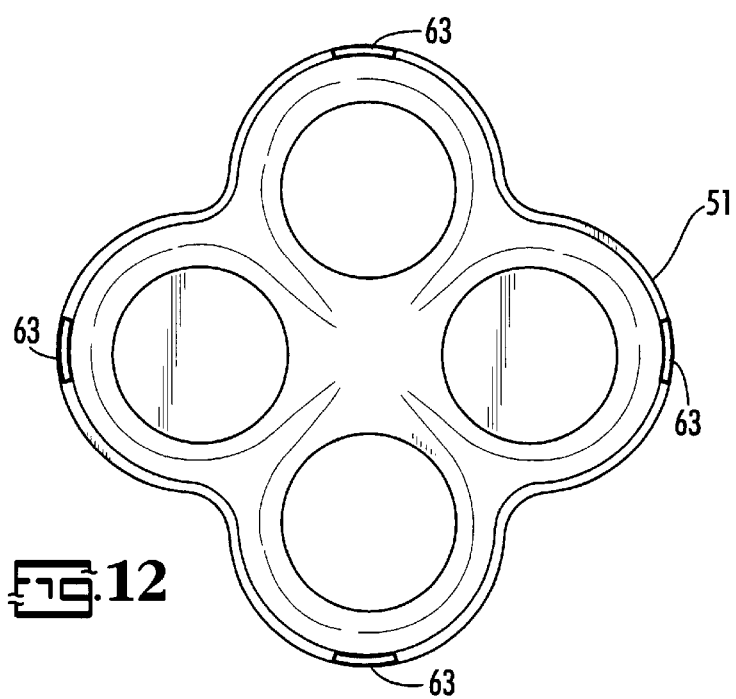

ANIMAL FOOD/WATER DISH

TECHNICAL FIELD

This invention relates to dishes for supplying food and water to animals, particularly small animals such as household pets.

BACKGROUND OF THE INVENTION AND INFORMATION DISCLOSURE STATEMENT

Heretofore, pet owners have used separate dishes to provide food and water for their pets. The following United States patents show various utensils for feeding and/or watering small animals.

U.S. Pat. No. design 218,831 issued Sep. 29, 1970 to D. C. Leeming for a Drinking Trough for Poultry which has an upstanding central portion terminating in a tube that is threaded to receive the end of a garden hose.

U.S. Pat. No. design 226,838 issued May 8, 1973 to W. Ruskin for a Combined Pet Food Bar Display Tray and Feed or Similar Article shows a shallow square pan with a horizontally extending handle.

U.S. Pat. No. design 289,807 issued May 12, 1987 to J. C. Russell for an Adjustable Height Pet Feeder shows a dish shaped food receptacle supported by three adjustable length legs.

U.S. Pat. No. 3,152,576 issued October, 1964 to G. W. Faurot for an Anti-splash Watering and Feeding Device for Animals illustrates an anti-splash watering dish which can be converted into a food dish by inserting a disposable container.

OBJECTS AND SUMMARY OF THE INVENTION

It is a primary object of this invention to provide a food/water dish for feeding pets which does not require a person to bend over to place the dish on the floor or to pick the dish up from the floor. It is a further object of this invention to provide a feeding dish for pets which permits the person feeding the pet to avoid body contact with the pet. A further object of the invention is to provide a food/water dish which is convenient to store when not in use and is easy to wash.

The food/water dish of this invention preferably has a relatively shallow food/water receptacle and an integrally formed central upstanding column shaped handle terminating in a grip portion at its upper end. The food /water receptacle may have a single food/water receiving compartment or it may have a plurality of food/water receiving compartments. The provision of a handle makes it possible for the pet owner to feed the pet without excessive bending or stooping. Persons with back problems, in wheelchairs, or the elderly will find it much easier to feed their pets with the dish with a handle. The handle also permits the pet owner to feed the pet without having the pet lick their hands or otherwise make body contact. In one embodiment of the invention the handle can be collapsed in telescopic fashion. The dish with a handle makes it easier to place the dish over a fence, in the event the animal in a fenced enclosure. The telescopic collapsed handle allows the dish to be stored in a smaller space.

BRIEF DESCRIPTION OF THE DRAWINGS

Several embodiments of the invention are illustrated by the drawings in which:

FIG. 1A is a perspective view of a food/water dish with a single ring shaped food/water receptacle with parts broken away for illustration purposes;

FIG. 1B is a vertical section of the food/water dish shown in FIG. 1A,

FIG. 2 is section showing construction of an embodiment of the invention having a collapsible handle;

FIG. 3 is a section similar to FIG. 2 but showing the handle collapsed;

FIG. 6 is a perspective view of a dish having three food/water receptacles;

FIG. 7 is a top view of the dish illustrated in FIG. 6;

FIG. 10 is a bottom view of the dish shown in FIGS. 6 and 7 showing non-skid pads on the bottom of the dish;

FIG. 11 is a bottom view of the dish shown in FIGS. 4 and 5 showing non-skid pads on the bottom of the dish and FIG. 12 is a bottom view of the dish shown in FIGS. 8 and 9 showing non-skid pads on the bottom of the dish.

DETAILED DESCRIPTION OF THE DRAWINGS

Figure 4:
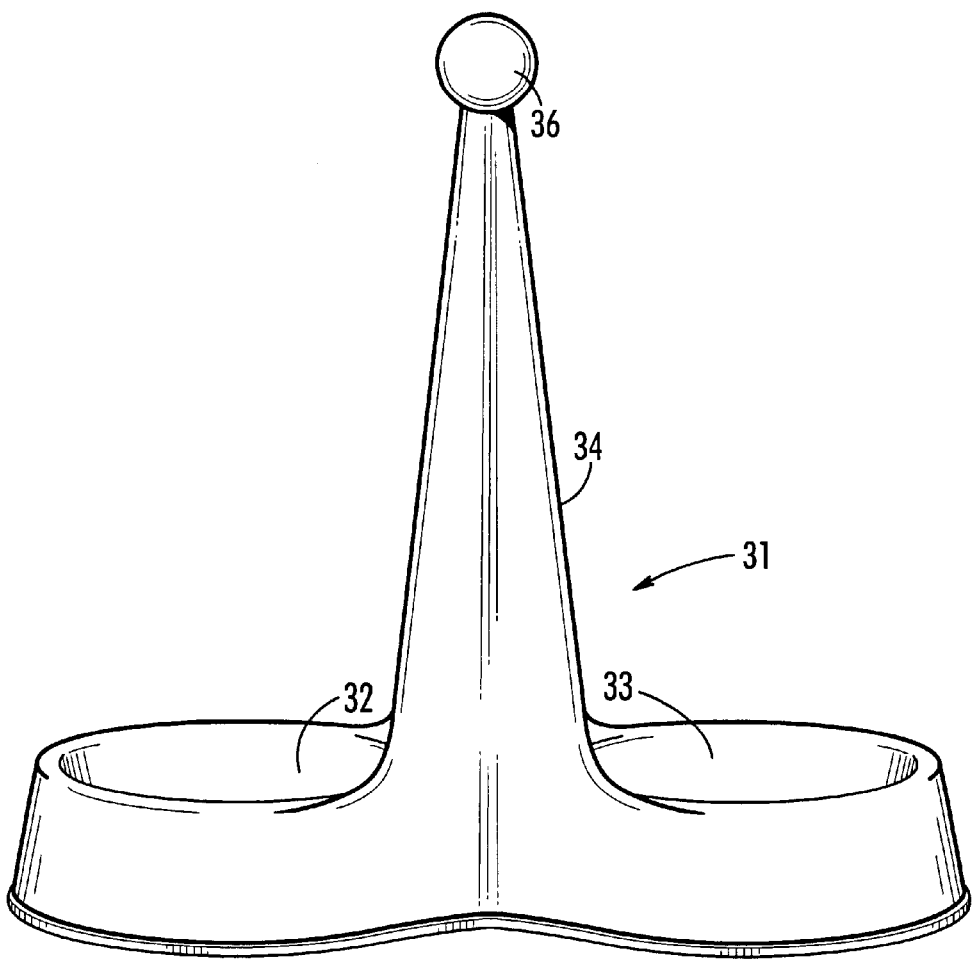
FIG. 4 is a perspective view of a food/water dish having two food/water receptacles.

FIGS. 1A and 1B illustrates a food/water dish 11 having an annular bowl or container 12 with a frusto-conical shaped outer wall 13, an inverted frusto-conical shaped inner wall 14 and a bottom wall 16 defining a single compartment for receiving food or water. A slender handle 17 includes a slender conically shaped column 19 which is secured at it lower end to the container 12 and extends upwardly, terminating at its upper end in a hand grip 18 in the shape of a knob or sphere, which as shown in FIG. 1B is threaded into a vertical threaded opening at the upper end of the conical column 19. The handle 17 is sufficiently long to permit feeding the pet without risking contact with the pet and preferably without requiring the person feeding the pet to bend over. This is an important advantage to people with back problems or injuries. Older pet owners, particularly, may need to avoid bending over for various other health reasons. Some people, when feeding pets, want to avoid having the pet lick their hands, or other wise make contact, when the feeding dish is set on the floor. The vertically disposed handle 17 of appropriate length permits placement of the dish on the floor at feeding time without back bending and without risk of unwanted contact with the pet. The container 12 and the handle 17 may integrally formed as a unitary, one piece construction. The dish 11 may be solid with out a hollow interior and the grip 18 may be integral rather than removable. If the dish is hollow as shown in FIG. 1B it may be stacked in storage or shipment. The removable grip 18 facilitates stacking. The dish 11 illustrated in FIG. 1 is suitable for feeding either food or water to a single pet or to several compatible pets.

Referring to FIGS. 2 and 3, a dish is illustrated which has a collapsible handle 21 with three telescoping section 22, 23, and 24. A ball shaped hand grip 26 is integrally formed on the upper end of the handle section 22. When not in use, the handle may be collapsed to a reduced height as shown in FIG. 3, in which condition, the dish takes up much less storage space in the vertical direction. The receptacle 28 is similar in construction to the dish shown in FIG. 1.

Figure 5:
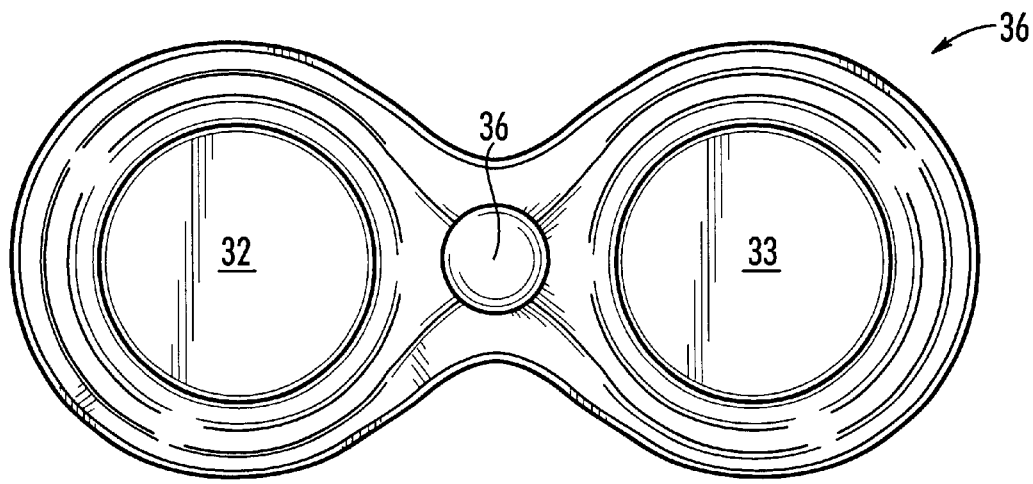
FIG. 5 is a top view of the dish shown in FIG. 4.

In FIGS. 4 and 5, a dish 31 is illustrated which has a bowl with two 32, 33 for receiving food and/or water. This embodiment of the invention permits both food and water to be fed to the pet simultaneously in separate receptacles. The upward tapering handle 34 terminates in a ball shaped hand grip 36. The dish illustrated in FIGS. 4 and 5 is suitable for simultaneously providing food and water (food in one compartment and water in the other compartment) for a single pet or for simultaneously feeding two pets either food or water.

The animal dish 41 shown in FIGS. 6 and 7 has an annular base container 42 which includes three compartments 43, 44, 45 for receiving food or water. A slender fluted handle 46 extends upwardly from the container 42 and terminates in a sphere shaped hand grip 47. This dish 41 is designed to feed either three items to a single pet or to feed three pets the same food or drink item.

Figure 8:
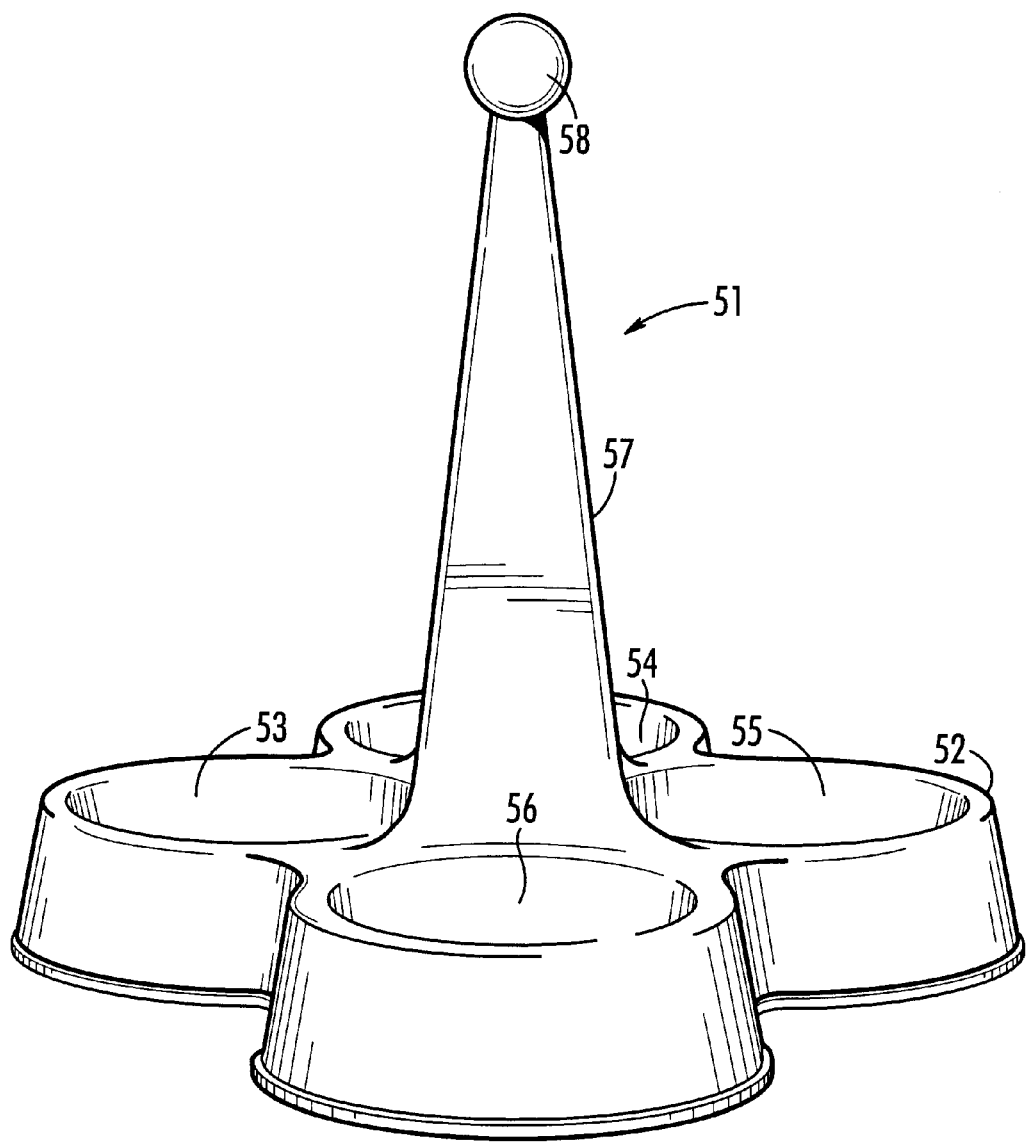
FIG. 8 is a perspective view of a dish having four food/water receptacles.
Figure 9:
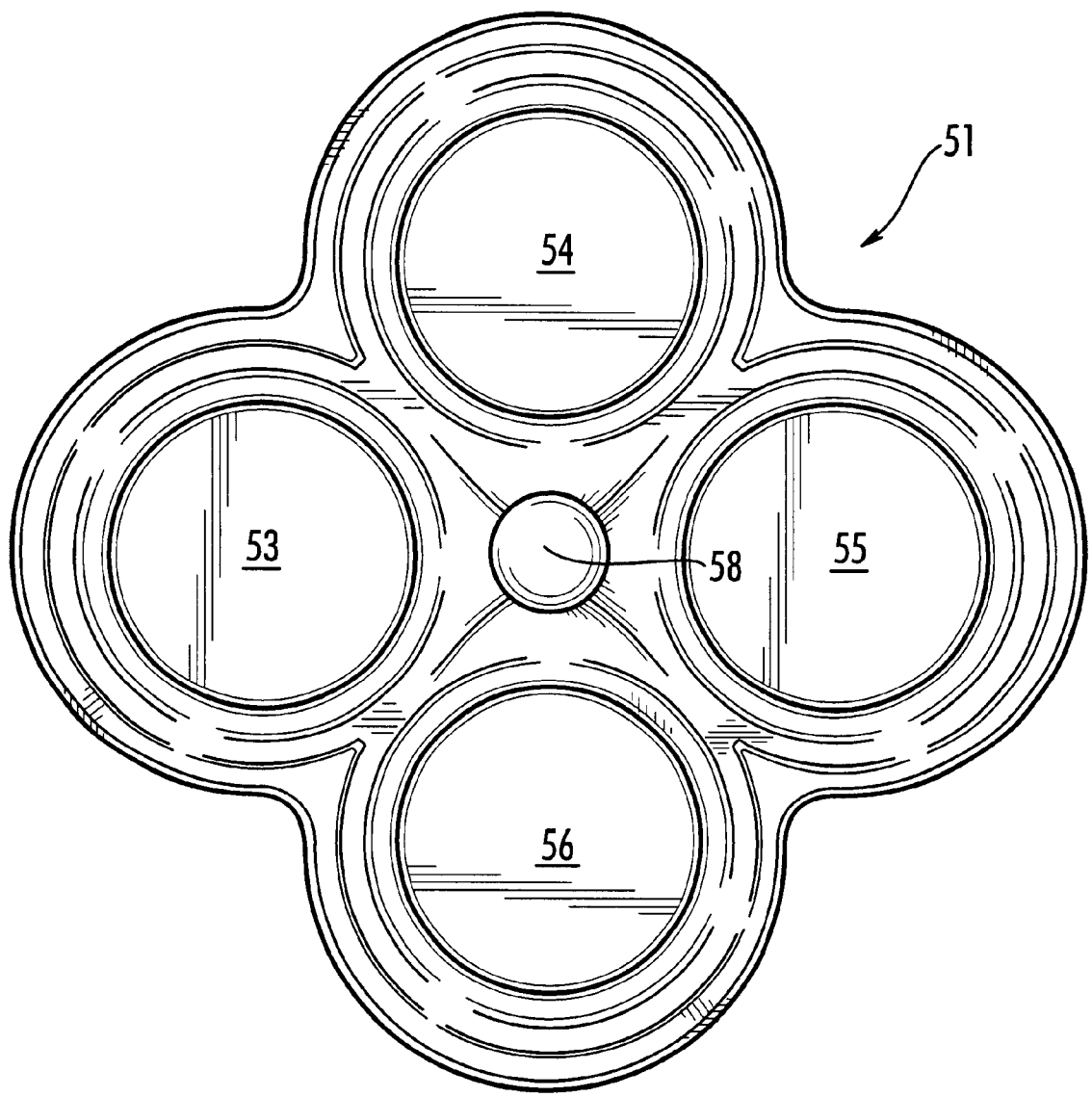
FIG. 9 is a top view of the dish shown in FIG. 8.

FIGS. 8 and 9 illustrate an animal feeding dish 51 which has a clover leaf shaped container 52 with four feeding compartments 53, 54, 56, and 57. An integrally formed handle 57 extends upwardly from the central part of the container 52 and is provided at its top with a spherically shaped hand grip 58. This as well as the other embodiments of the invention are designed to be relatively stable when resting on the floor; the embodiment shown in FIGS. 3 and 4 being somewhat less stable than the other illustrated embodiments However the two compartment embodiment of FIGS. 3 and 4 is best suited to feeding a single pet and in that event there is no interaction between pets tending to tip over the dish.

FIGS. 10, 11 and 12 show non-skid material in the form of pads 61, 62, and 63 on animal feeding dishes 41, 31 and 51, respectively. The use of non-skid pads prevents the pet or pets being fed from the moving the dish on the floor during feeding.

SUMMARY OF ADVANTAGES

Some of the advantages of use of the extended handle pet dish of this invention are:

1) Excessive bending or stooping is eliminated;
2) Contact with the pet can be avoided - fingers can be kept clean;
3) The handle makes it easier to rinse the dish under a faucet;
4) The handle provides a more secure hold on the dish;
5) The handle makes it easier to place the dish over a fence;
6) Persons with back problems, in wheel chairs, or the elderly, can manage the dish with a handle more easily;
7) The retractable handle makes the dish easier to store;
8) The non-skid material on the bottom of the dish prevents the pet from sliding the dish on the floor.

What is claimed is:

1. A feeding dish for small domestic animals comprising:

a relatively shallow bowl designed to rest in a stable manner directly on the floor and having at least one compartment for selectively feeding food and water to small domestic animals and a slender elongated handle having a bottom end secured to said bowl and extending vertically to an upper end and a hand grip on said upper end;

said handle being sufficiently long to substantially eliminate the need for an adult person feeding an animal to bend his or her back and said dish being sufficiently light to permit said adult person to lift and transport said dish by single handed engagement with said hand grip.

2. The feeding dish of claim 1 wherein said handle is connected to a central part of the bowl.

3. The feeding dish of claim 2 which said bowl has a plurality of compartments.

4. The feeding dish of claim 1 wherein said handle is telescopic.

5. The feeding dish of claim 1 wherein said bowl and handle are hollow and have tapered walls permitting stacking of said dishes one within another thereby reducing storage space.

6. A feeding dish for small, domesticated animals comprising:

a bowl having a bottom adapted to rest in a stable manner on a floor and having at least one compartment for food and an upright slender elongated handle having a lower end secured to said bowl and having an upper end gripable by a human hand, said handle being sufficiently long to permit an adult person to place the dish on the floor without requiring said adult to bend his or her back and said dish being sufficiently light to permit an adult to lift and transport said dish by single handed engagement with said handle.

7. The feeding dish of claim 6 wherein said bowl and handle are integrally formed.

\* \* \* \* \*